United States Patent
Oh et al.

(10) Patent No.: US 12,038,913 B2
(45) Date of Patent: Jul. 16, 2024

(54) METHOD FOR MANAGING DATABASE

(71) Applicant: TmaxTibero Co., Ltd., Seongnam-si (KR)

(72) Inventors: Jaemin Oh, Seongnam-si (KR); Hakju Kim, Gwangju-si (KR); Dongyun Yang, Seoul (KR); Sangyoung Park, Seoul (KR)

(73) Assignee: TmaxTibero Co., Ltd., Seongnam-si (KR)

( * ) Notice: Subject to any disclaimer, the term of this patent is extended or adjusted under 35 U.S.C. 154(b) by 10 days.

(21) Appl. No.: 17/974,388

(22) Filed: Oct. 26, 2022

(65) Prior Publication Data

US 2023/0325380 A1 Oct. 12, 2023

(30) Foreign Application Priority Data

Mar. 24, 2022 (KR) .......................... 10-2022-0036556

(51) Int. Cl.
  *G06F 16/23* (2019.01)
(52) U.S. Cl.
  CPC ................................ *G06F 16/2379* (2019.01)
(58) Field of Classification Search
  CPC ...... G06F 16/2379; G06F 16/27; G06F 3/067; G06F 11/34; G06F 16/2358; G06F 16/25
  See application file for complete search history.

(56) References Cited

U.S. PATENT DOCUMENTS

| | | | |
|---|---|---|---|
| 9,880,933 B1 * | 1/2018 | Gupta | G06F 3/0656 |
| 2007/0276833 A1 * | 11/2007 | Sen | G06F 16/22 |
| 2008/0140937 A1 * | 6/2008 | Nalawade | G06F 12/0871 |
| | | | 711/119 |
| 2019/0188283 A1 | 6/2019 | Fuller | |
| 2020/0372000 A1 | 11/2020 | Fuller | |
| 2021/0034571 A1 * | 2/2021 | Bedadala | G06F 16/134 |
| 2023/0058668 A1 * | 2/2023 | Roberts | G06F 12/0895 |

FOREIGN PATENT DOCUMENTS

| | | |
|---|---|---|
| KR | 10-1430239 B1 | 8/2014 |
| KR | 10-2021-0121315 A | 10/2021 |

* cited by examiner

*Primary Examiner* — Angelica Ruiz
(74) *Attorney, Agent, or Firm* — Seed IP Law Group LLP

(57) ABSTRACT

Disclosed is a method for managing a database, which is performed by a first database server including at least one processor constituting a cluster jointly with at least one second database server. The method for managing a database may include loading, on a buffer cache, a first data block based on a first transaction for modifying the first data block located in a sharing storage shared jointly with the at least one second database server. The method may include modifying the first data block loaded on the buffer cache. The method may include determining flushing a first log generated by the modification of the first data block to the sharing storage.

19 Claims, 12 Drawing Sheets

METHOD FOR MANAGING DATABASE

CROSS-REFERENCE TO RELATED APPLICATIONS

This application claims priority to and the benefit of Korean Patent Application No. 10-2022-0036556 filed in the Korean Intellectual Property Office on Mar. 24, 2022, the entire contents of which are incorporated herein by reference.

BACKGROUND

Technical Field

The present disclosure relates to a method for managing a database, and particularly, to a method for managing a database in a cluster environment.

Description of the Related Art

As a means for enhancing transactional processing performance while securing high availability of a database management system (DBMS), database cluster or database clustering technology can be present. Cluster as a structure in which multiple servers are combined into one and operate, e.g., the database cluster may be a scheme in which multiple database servers are combined into one and constructed.

As the database cluster technology, Active-Standby DB Clustering or Active-Active DB Clustering technology can be present.

BRIEF SUMMARY

The Active-Standby DB Clustering technology may be a scheme in which only one database server is operated in an active state and the other database server is operated in a standby state. The Active-Standby DB Clustering technology may be technology in which when the database server in the active state is down due to an unexpected accident, the other database server in the standby state is switched to the active state. In the case of the Active-Standby DB Clustering technology, cost required for operating the server may be a bit cheaper, but when the database server in the active state is down, a time is required for the other database server to be switched to the active state, and as a result, there may be a disadvantage in that the server is temporarily suspended.

On the contrary, in the case of the Active-Active DB Clustering technology, since each of the database servers constituting the cluster in the active state, the other database server is also in the active state even though any one database server is down, so there may be an advantage in that a time when the server is down is not almost generated. However, in the case of the Active-Active DB Clustering technology, as one storage is shared, a bottleneck phenomenon in which processing of data is delayed may occur.

One or more embodiments of the present disclosure has been made in an effort to address the various technical problems in the related art including the technical problem identified above. One or more embodiments of the present disclosure provide a method for managing a database in an Active-Active database cluster environment.

However, as mentioned, technical objects of the present disclosure are not restricted to the technical object mentioned as above. Other unmentioned technical objects will be apparently appreciated by those skilled in the art by referencing to the following description.

An example embodiment of the present disclosure provides a method for managing a database, which is performed by a first database server including at least one processor constituting a cluster jointly with at least one second database server. The method for managing a database may include: loading, on a buffer cache, a first data block based on a first transaction for modifying the first data block located in a sharing storage shared jointly with the at least one second database server; modifying the first data block loaded on the buffer cache; and determining flushing a first log generated by the modification of the first data block to the sharing storage.

The method may further include: receiving a request for delivery of the first data block from the at least one second database server; determining whether the first log is flushed to the sharing storage; and delivering first information indicating that the first log generated by the modification of the first data block is not flushed to the sharing storage, and the first data block to the at least one second database server when the first log is not flushed to the sharing storage.

The method may further include: receiving a request for delivery of the first data block from the at least one second database server; determining whether the first log is flushed to the sharing storage; and delivering the first data block to the at least one second database server when the first log is flushed to the sharing storage.

The method may further include: determining whether to return information related to the first data block through a data block referring process, in which the data block referring process may include determining first positional information indicating a position on which the first data block is loaded in response to reception of a second transaction or a session for referring to the first data block, receiving second information indicating that a second log generated by the modification of the first data block is not flushed to the sharing storage and the first data block from the at least one second database server determined based on the first positional information, loading the first data block on the buffer cache, and referring to the first data block based on the second transaction or session, and determining whether to return the information related to the first data block based on whether the second log being flushed to the sharing storage, wherein the information related to the first data block is data generated by referring to the first data block.

The determining of whether to return the information related to the first data block based on whether the second log being flushed to the sharing storage may include when it is determined that the second log is flushed to the sharing storage, returning the information related to the first data block.

The determining of whether to return the information related to the first data block based on whether the second log being flushed to the sharing storage may include repeatedly performing the data block referring process when it is determined that the second log is not flushed to the sharing storage, or processing the data block referring process as a failure when it is determined that the second log is not flushed to the sharing storage.

The method may further include: determining first positional information indicating a position on which the first data block is loaded in response to reception of a third transaction for modifying the first data block; receiving second information indicating that a second log generated by the modification of the first data block is not flushed to the sharing storage and the first data block from the at least one second database server determined based on the first positional information; loading the first data block on the buffer cache, and modifying the first data block based on the third transaction; and determining whether to return the information related to the first data block based on whether the second log being flushed to the sharing storage, wherein the information related to the first data block includes a result of modifying the first data block and a commit result of the third transaction.

The determining of whether to return the information related to the first data block based on whether the second log being flushed to the sharing storage may include when it is determined that the second log is flushed to the sharing storage, returning the information related to the first data block modified based on the third transaction.

The determining of whether to return the information related to the first data block based on whether the second log being flushed to the sharing storage may include when it is determined that the second log is not flushed to the sharing storage, rolling back the first data block modified by a fourth transaction related to the second log without returning the information related to the first data block.

The rolling back of the first data block modified by the fourth transaction related to the second log without returning the information related to the first data block may include invalidating the first data block in the buffer cache, determining second positional information indicating a position at which a latest version of $1\text{-}1^{st}$ data block related to the first data block is loaded, receiving the $1\text{-}1^{st}$ data block from the at least one second database server or the sharing storage determined based on the second positional information, and replacing the $1\text{-}1^{st}$ data block with the first data block to roll back the first data block.

The method may include: determining whether at least one third log not reflected on the $1\text{-}1^{st}$ data block is flushed to the sharing storage after rolling back the first data block; when there is the at least one third log, modifying the $1\text{-}1^{st}$ data block based on a fifth transaction related to the at least one third log; and replacing the modified $1\text{-}1^{st}$ data block with the first data block to recover the first data block.

Another example embodiment of the present disclosure provide a first database server for managing a database, including: a storage unit loading a first data block located in a sharing storage shared jointly with at least one second database server on a buffer cache; and a process modifying the first data block loaded on the buffer cache based on a first transaction for modifying the first data block, and determining flushing a first log generated by the modification of the first data block to the sharing storage.

Still?? another example embodiment of the present disclosure provides a computer program stored in a computer-readable storage medium, in which when the computer program is executed by one or more processors, the computer program executes a method for managing a database, and the method may include: loading, on a buffer cache, a first data block based on a first transaction for modifying the first data block located in a sharing storage shared jointly with at least one second database server; modifying the first data block loaded on the buffer cache; and determining flushing a first log generated by the modification of the first data block to the sharing storage.

Technical solving means which can be obtained in the present disclosure are not limited to the aforementioned solving means and other unmentioned solving means will be clearly understood by those skilled in the art from the following description.

According to some example embodiments of the present disclosure, a method for managing a database, which can enhance data processing performance in an Active-Active database cluster environment can be provided.

Effects which can be obtained in the present disclosure are not limited to the aforementioned effects and other unmentioned effects will be clearly understood by those skilled in the art from the following description.

BRIEF DESCRIPTION OF THE SEVERAL VIEWS OF THE DRAWINGS

Various aspects are now described with reference to the drawings and like reference numerals are generally used to designate like elements. In the following example embodiments, for the purpose of description, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

DETAILED DESCRIPTION

Figure 1:
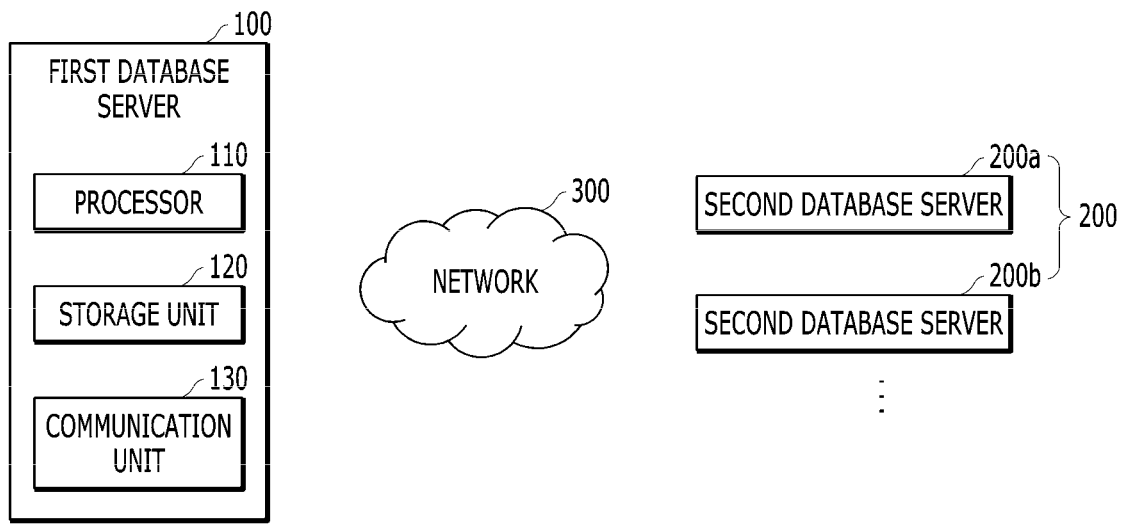
FIG. 1 illustrates an example system for performing a method for managing a database according to some example embodiments of the present disclosure.

Various example embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific example aspects of one or more aspects will be described in detail. However, the aspects are example and some of various methods in principles of various aspects may be used and the descriptions are intended to include all of the aspects and equivalents thereof. Specifically, in "embodiment," "example," "aspect," "illustration," and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an example embodiment disclosed in the present disclosure, a detailed description of related known technologies will be omitted if it is determined that the detailed description makes the gist of the example embodiment of the present disclosure unclear. Further, the accompanying drawings are only for easily understanding the example embodiment disclosed in this specification and the technical spirit disclosed by this specification is not limited by the accompanying drawings.

Although the terms "first," "second," and the like are used for describing various elements or components, these elements or components are not confined by these terms, of course. These terms are merely used for distinguishing one element or component from another element or component. Therefore, a first element or component to be mentioned below may be a second element or component in a technical spirit of the present disclosure.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

In addition, the word "comprises" and/or "comprising" means that the corresponding feature and/or component is present, but it should be appreciated that presence or addition of one or more other features, components, and/or a group thereof is not excluded. Further, when not separately specified or it is not clear in terms of the context that a singular form is indicated, it should be construed that the singular form generally means "one or more" in this specification and the claims.

Further, the terms "information" and "data" used in the specification may also be often used to be exchanged with each other.

It should be understood that, when it is described that a component is "connected to" or "accesses" another component, the component may be directly connected to or access the other component or another component may be present therebetween. In contrast, it should be understood that, when it is described that a component is "directly connected to" or "directly access" another component, no component is present between the component and another component.

Suffixes "module" and "unit" for components used in the following description are given or mixed in consideration of easy preparation of the specification only and do not have their own distinguished meanings or roles.

The objects and effects of the present disclosure, and technical constitutions of accomplishing these will become obvious with reference to example embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or a usual practice of a user or an operator.

However, the present disclosure is not limited to example embodiments disclosed below but may be implemented in various different forms. However, the example embodiments are provided to make the present disclosure be complete and completely announce the scope of the present disclosure to those skilled in the art to which the present disclosure belongs. Accordingly, the terms need to be defined based on contents throughout this specification.

In the present disclosure, a database server may constitute a cluster jointly with at least one other database server. The cluster may be a scheme in which multiple database servers are combined into one abstracted server and constructed. That is, a user may use a plurality of database servers by using one abstracted server. As an example, the database server may load a first data block located in a sharing storage or the other database server on a buffer cache according to first transaction generated based on an input from the user. Here, the sharing storage may be a storage (e.g., a persistent storage medium) shared by the database server and the other database server. The buffer cache may be a memory provided in each database server. The first data block loaded on the database server may be modified by a second transaction prior to the first transaction. The database server may determine whether a first log generated as the first data block is modified by the second transaction is flushed to the sharing storage. In the present disclosure, the flush may be appreciated as a task of recording or storing a log generated in a modification process of the data block in the sharing storage. The database server may record first information indicating that the first log is not flushed to the sharing storage in link with loading the first data block in a memory when the first log is not flushed to the sharing storage. The database server may modify the first data block based on the first transaction. Thereafter, when it is determined that the first log is flushed to the sharing storage, the database server may return information related to the first data block to the user. In order for the database server to modify the first data block according to the first transaction in a database cluster environment in the related art, flushing the first log according to the second transaction may be required to be completed. That is, in the related art, when the first data block is modified by the second transaction, the first log generated by the modification of the first data block may be flushed to the sharing storage, and after the flushing of the first log is completed, the first data block may be modified according to the first transaction. In other words, the database server may be required to wait for completing a flushing task of the first log, which is performed by the other database server in order to modify the first data block. Therefore, even though a plurality of database servers is operated by constructing the database cluster environment, the modification of the first data block may be performed only sequentially or in series by the plurality of database servers. Further, operations of modifying the first data block by the plurality of database servers may be performed by buffer caches of the respective database servers. The flushing of the log performed by the plurality of database servers may be an operation performed for the sharing storage (persistent storage medium). Therefore, the operations of modifying the first data block by the database servers may be terminated earlier than the operation of completing the flushing of the log. As a result, the database servers may wait only for the flushing of the log after modifying the first data block. Accordingly, there is a problem in that performances of the database servers are not sufficiently implemented in the database cluster environment.

The database server in the present disclosure may record first information indicating that the first log is not flushed to the sharing storage in link with loading the first data block on the buffer cache in the memory when the first log is not flushed to the sharing storage. In addition, the database server modifies the first data block based on the first transaction, and then when it is determined that the first log is flushed to the sharing storage, return the information related to the first data block to the user. Hereinafter, a method for managing the database according to the present disclosure will be described through FIGS. 1 to 13.

FIG. 1 illustrates an example system for performing a method for managing a database according to some example embodiments of the present disclosure.

Referring to FIG. 1, the first database server 100 may include a processor 110, a storage unit 120, and a communication unit 130. However, components described above are not required in implementing the first database server 100 and the first database server 100 may thus have components more or less than components listed above.

The first database server 100 may include a predetermined type of computer system or computer device such as a microprocessor, a mainframe computer, a digital processor, a portable device, and a device controller.

In the present disclosure, the first database server 100 may be a virtual server. As an example, the database cluster environment may be an environment in which a plurality of instances is operated by one main database server. The instance may be a virtual machine which may use an application or a resource stored in the main database server. The instance may also be a virtual machine implemented by at least one of agent, application programming interface (API), and plug-in. In this case, the first database server 100 may be appreciated as a first instance among the plurality of instances, and at least one second database server 200 may be appreciated as at least one second instance among the plurality of instances.

The processor 110 may control an overall operation of the first database server 100. The processor 110 processes a signal, data, information, and the like input or output through the components of the first database server 100 or drives the application program stored in the memory to provide or process appropriate information or function.

The processor 110 may be constituted by one or more cores and may include processors for data analysis, which include a central processing unit (CPU), a general purpose graphics processing unit (GPGPU), a tensor processing unit (TPU), and the like of the first database server 100.

In the present disclosure, the processor 110 may load, on the buffer cache, the first data block located in the sharing storage based on the first transaction for modifying the first data block generated based on the input from the user. Here, the sharing storage may be a storage shared jointly with at least one second database server 200 constituting the cluster. The buffer cache may be the memory of the first database server 100. According to the example embodiment, the first database server 100 may be the first instance implemented by the main database server and at least one second database server 200 may be the second instance implemented by the main database server. In this case, the sharing storage may be the persistent storage medium included in the main database server. The processor 110 may modify the first data block loaded on the buffer cache. The processor 110 may determine flushing the first log generated by the modification as the first data block to the sharing storage. In the present disclosure, the flush may be appreciated as a task of recording or storing a log generated in a modification process of the data block in the sharing storage. Hereinafter, an example in which the processor 110 determines flushing the first log to the sharing storage will be described through FIG. 2.

In the present disclosure, the transactions generated based on the input from the user may include a Data Manipulation Language (DML), a Data Definition Language (DDL), or a Data Control Language (DCL). The DML may be a language including SELECT, INSERT, UPDATE, or DELETE. The DDL may be a language including CREATE, ALTER, DROP, or TRUNCATE. The DCL may be a language including GRANT, REVOKE, COMMIT, ROLLBACK, etc. The processor 110 may modify or refer to the first data block based on the transaction including the DML, the DDL, or the DCL.

The storage unit 120 may include a memory and/or a persistent storage medium. The memory may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The storage unit 120 may include one or more memories including a buffer cache. Here, the memory as a primary storage device directly accessed by the processor 110, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by the processor 110. The memory may include a buffer cache and data may be stored in a data block of the buffer cache. The data may be recorded in the storage unit 120 by a background process.

The storage unit 120 may store any type of information created or determined by the processor 110 or any type of information received by the communication unit 130. According to the example embodiment, the first database server 100 may include only one or more memories including the buffer cache, and a disk type storage medium such as the persistent storage medium may also be included only in the main database server.

The communication unit 130 may include one or more modules which enable communication between the first database server 100 and a communication system, between the first database server 100 and at least one second database server 200, between the first database server 100 and the main database server, or between the first database server 100 and the network 300. The communication unit 130 may include at least one of a wired Internet module, and a wireless Internet module.

The network 300 may be configured regardless of communication modes such as wired and wireless modes and constituted by various communication networks including a personal area network (PAN), a local area network (LAN), a wide area network (WAN), and the like. Further, the network may be known World Wide Web (WWW) and may adopt a wireless transmission technology used for short-distance communication, such as infrared data association (IrDA) or Bluetooth. The techniques described in this specification may also be used in other networks in addition to the aforementioned networks.

At least one second database server 200 may include a predetermined type of computer system or computer device such as a microprocessor, a mainframe computer, a digital processor, a portable device, and a device controller.

In the present disclosure, at least one second database server 200 may be the virtual server. As an example, at least one second database server 200 may be at least one second instance among the plurality of instances which may use the application or resource stored in the main database server.

In the present disclosure, at least one second database server 200 may receive the first data block from the first database server 100. At least one second database server 200 may load, on the buffer cache, the first data block received from the first database server 100. At least one second database server 200 may determine flushing a second log generated by the modification as the first data block to the sharing storage.

According to some example embodiments of the present disclosure, at least one second database server 200 may receive the first information indicating that the first log generated by the modification of the first data block in the first database server 100 is not flushed to the sharing storage, and the first data block from the first database server 100. Specifically, the first database server 100 may determine flushing the first log generated by the modification of the first data block to the sharing storage when modifying the first data block based on the first transaction. At least one second database server 200 may request delivery of the first data block before flushing the first log to the sharing storage. At least one second database server 200 may record the first information in the memory, and modify the first data block based on a second transaction generated from the user. At least one second database server 200 may not flush the second log generated by the modification of the first data block to the sharing storage, but wait for flushing the first log to the sharing storage. At least one second database server 200 may flush the second log to the sharing storage when the information indicating that the flushing of the first log is completed is synchronized.

The second database server in the database cluster environment in the related art may modify the first data block based on the second transaction after the information indicating that the flushing of the first log is completed is synchronized. As a result, a lot of total task time for modifying the first data block based on the first and second transactions may be consumed. However, according to the present disclosure, at least one second database server 200 may modify the first data block based on the second transaction before the flushing of the first log is completed. In other words, a time required for at least one second database server 200 to modify the first data block may be overlapped with the time of flushing the first log by the first database server 100. Therefore, the total task time for modifying the first data block based on the first and second transactions may be shortened. Hereinafter, the method for managing the database according to the present disclosure will be described in more detail.

Figure 2:
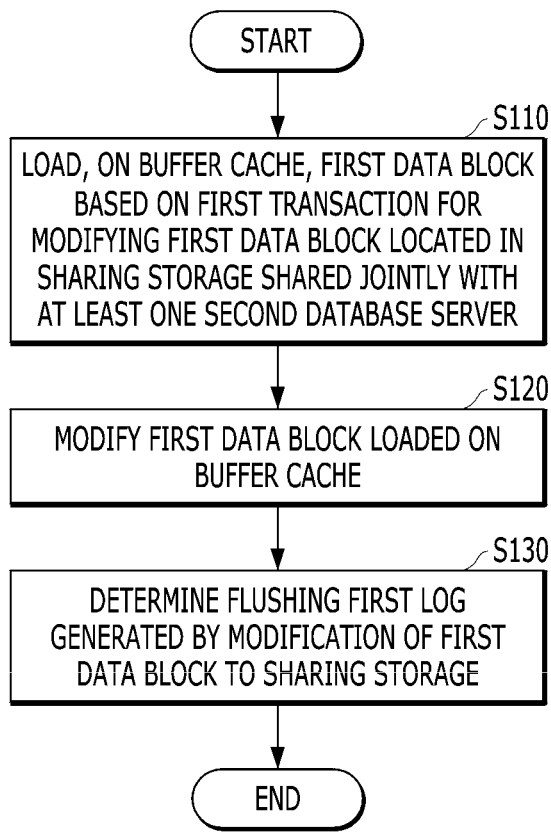
FIG. 2 is a flowchart for describing an example of a method for determining flushing a first log to a sharing storage by a first database server according to some example embodiments of the present disclosure.

FIG. 2 is a flowchart for describing an example of a method for determining flushing a first log to a sharing storage by a first database server according to some example embodiments of the present disclosure.

Referring to FIG. 2, the storage unit 120 of the first database server 100 may load the first data block on the buffer cache based on the first transaction for modifying the first data block located in the sharing storage shared jointly with at least one second database server 200 (S110).

Specifically, the first transaction may include the DML, the DDL, or the DCL. The processor 110 may determine the first data block among the plurality of data blocks located in the sharing storage based on the first transaction. The processor 110 may load the determined first transaction on the buffer cache of the storage unit 120.

According to the example embodiment, the first data block may also be loaded on at least one second database server 200. The processor 110 may load the first data block loaded on at least one second database server 200 on the buffer cache of the storage unit 120.

The processor 110 may modify the first data block loaded on the buffer cache based on the first transaction for modifying the first data block (S120).

According to the example embodiment, the first transaction may also be the transaction for referring to or searching the first data block such as select statement. When the first transaction is the transaction including select statement, the processor 110 may also just refer to or search the first data block without modifying the first data block.

The processor 110 may determine flushing the first log generated as the modification of the first data block to the sharing storage (S130).

Specifically, the processor 110 may modify the first data block and commit the first data block at a first time point, based on the first transaction. The commit may be appreciated as storing the modified data block in the database and terminating the transaction. The first time point may be appreciated as a predetermined time point for managing a modification history of the data block. In other words, the processor 110 may store the first data block modified based on the first transaction in the block cache, and terminate the first transaction at the first time point. When the commit of the first transaction is completed, the processor 110 may determine flushing the first log generated by the first transaction to the sharing storage.

In the present disclosure, the first log may include modified contents of the first data block based on the first transaction and information capable of returning the first data block to a state before modification.

According to some example embodiments of the present disclosure, after the processor 110 determines flushing the first log to the sharing storage, the processor 110 may modify the first data block based on the transaction generated based on the input from the user before the flushing of the first log is completed. When the processor 110 modifies the first data block, the processor 110 may commit the transaction at the second time point after the first time point. The processor 110 may determine flushing the second log generated by the transaction to the sharing storage based on whether the flushing of the first log being completed. For example, the processor 110 may determine flushing the first log to the sharing storage when determining that the flushing of the first log is completed. As another example, the processor 110 may determine waiting without flushing the second log to the sharing storage when determining that the flushing of the first log is not completed.

According to the configuration, the first database server 100 may flush the first log generated by the modification of the first data block to the sharing storage. The first log may include modified contents of the first data block by the first database server 100 and the information capable of returning the first data block to the state before modification. As a result, at least one other second database server 200 may recover the first data block to latest data based on the first log flushed to the sharing storage even though a situation in which the first database server 100 is down occurs.

According to some example embodiments of the present disclosure, the first database server 100 may deliver the first data block of which modification is completed to at least one second database server 200. When the flushing of the first log is not completed, the first database server 100 may deliver the first information indicating that the first log generated by the modification of the first data block is not flushed to the sharing storage to the second database server 200 jointly. Hereinafter, an example of a method in which the first database server 100 delivers the first data block will be described with reference to FIG. 3.

Figure 3:
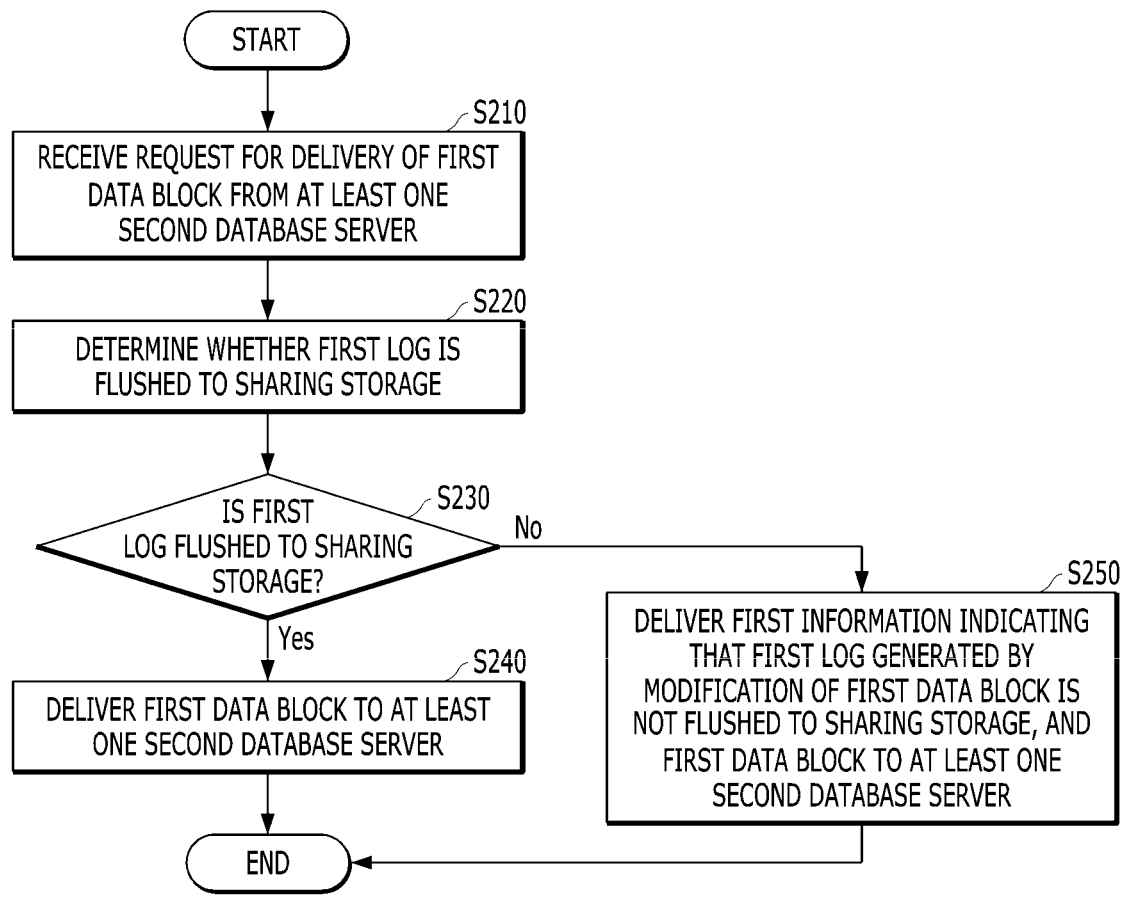
FIG. 3 is a flowchart for describing an example of a method in which a first database server delivers a first data block to at least one second database server according to some example embodiments of the present disclosure.

FIG. 3 is a flowchart for describing an example of a method in which a first database server delivers a first data block to at least one second database server according to some example embodiments of the present disclosure.

Referring to FIG. 3, the communication unit 130 of the first database server 100 may receive a request for delivery of the first data block from at least one second database server 200 (S210).

The processor 110 may determine whether the first log is flushed to the sharing storage (S220). When the first log is flushed to the sharing storage (Yes in S230), the processor 110 may deliver the first data block to at least one second database server 200 through the communication unit 130 (S240). When at least one second database server 200 receives the first data block, at least one second database server 200 may load the first data block on the buffer cache of at least one second database server 200. At least one second database server 200 may modify the first data block loaded on the buffer cache.

When the first log is not flushed to the sharing storage (No in S230), the processor 110 may deliver the first information indicating that the first log generated by the modification of the first data block is not flushed to the sharing storage, and the first data block to at least one second database server 200 through the communication unit 130 (S250).

According to some example embodiments of the present disclosure, when at least one second database server 200 receives the first information and the first data block, at least one second database server 200 may load the first data block on the buffer cache of at least one second database server 200. At least one second database server 200 may modify the first data block loaded on the buffer cache. After the modification of the first data block is completed, at least one second database server 200 may determine whether to return the information related to the first data block based on whether the first log being flushed to the sharing storage. When the information indicating that the first log is flushed is synchronized with the sharing storage, at least one second database server 200 may return the information related to the first data block modified based on the second transaction. Alternatively, when the information indicating that the first log is flushed is not synchronized with the sharing storage, at least one second database server 200 may roll back the first data block modified based on the second transaction. Here, roll-back may be an operation of returning the first data block to the state before the modification. According to the example embodiment, when at least one second database server 200 rolls back the first data block, at least one second database server 200 may retry the task of modifying the first data block based on the second transaction or process the second transaction as a failure. When processing the second transaction as the failure, at least one second database server 200 may also deliver information indicating the failure of the second transaction to the user. The operation performed by at least one second database server 200 may be performed by the first database server 100, of course.

According to the configuration, the first database server 100 may deliver only the first data block to at least one second database server 200 or deliver the first information to at least one second database server 200 jointly with the first data block, based on whether the first log being flushed to the sharing storage. When the first information is delivered jointly with the first data block, at least one second database server 200 may modify the first data block based on the second transaction and determine flushing the second log generated by the modification of the first data block to the sharing storage. However, when it is determined that the first log is not flushed, at least one second database server 200 may not return the information related to the first data block to the user. The first database server 100 may modify the first data block based on the first transaction, and then, even though the first database server 100 commits the first transaction, when the first log is not flushed to the sharing storage, the commit may not be confirmed. If at least one second database server 200 returns the information related to the first data block to the user before the flushing of the first log is completed, a matching error may occur. Here, the matching error may be an error in which modified contents which are not committed are recognized as committed modified contents, and delivered to the user. Accordingly, the first database server 100 may deliver only the first data block to at least one second database server 200 or deliver the first information to at least one second database server 200 jointly with the first data block, based on whether the first log being flushed to the sharing storage. As a result, the matching error which may occur in the plurality of database servers may be prevented. In addition, at least one second database server 200 may modify the first data block based on the second transaction in spite of receiving the first information. Therefore, since the second database server 200 modifies the first data block for a time for which the first log is flushed when the first database server 100 is not down, the time required for delivering the information related to the first data block to the user may be consequently reduced.

According to some example embodiments, the first database server 100 may determine whether to return the information related to the first data block based on whether the log generated by the modification of the first data block being flushed to the sharing storage. Hereinafter, a method for determining whether to return the information related to the first data block when the first database server 100 refers to the first data block will be described.

Figure 4:
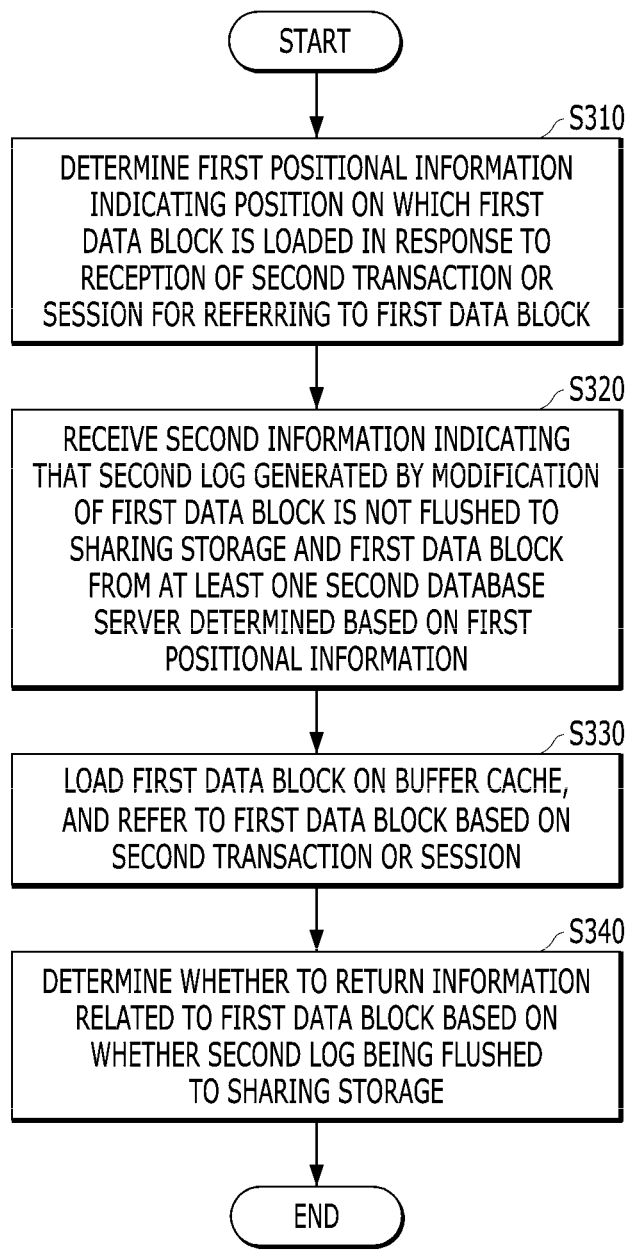
FIG. 4 is a flowchart for describing an example of a method for determining whether to return information related to the first data block when the first database server refers to the first data block according to some example embodiments of the present disclosure.

FIG. 4 is a flowchart for describing an example of a method for determining whether to return information related to the first data block when the first database server refers to the first data block according to some example embodiments of the present disclosure.

In the present disclosure, the processor 110 of the first database server 100 may determine whether to return the information related to the first data block through a process of referring to the data block. A meaning of referring to the first data block may be appreciated as a meaning of not directly modifying data included in the first data block, but just referring to the data. For example, the data block referring process may be a process performed based on the SELECT statement in the DML.

Specifically, referring to FIG. 4, the processor 110 of the first database server 100 may determine first positional information indicating a position at which the first data block is loaded in response to reception of the second transaction or session for modifying the first data block as the data block referring process (S310). Here, the session may mean an overall period up to a connection termination after performing multiple tasks by starting with the connection of the database. The session may include at least one transaction. In the present disclosure, the session may be appreciated as a subject using the first data block based on at least one transaction.

For example, the processor 110 may determine the first positional information indicating the position of the buffer cache of the second database server on which the first data block is loaded among one or more second database servers 200. As another example, the first data block may also be loaded on the buffer cache of the first database server 100 itself. The processor 110 may determine the first positional information indicating the position of the first data block loaded on the buffer cache thereof. As still another example, the first data block may also be loaded on the sharing storage. The processor 110 may determine the first positional information indicating the position of the first data block loaded on the sharing storage.

The communication unit 130 may receive the second information indicating that the second log generated by the modification of the first data block is not flushed to the sharing storage and the first data block from at least one second database server 200 determined based on the first positional information (S320). When the storage unit 120 receives the second information through the communication unit 130, the storage unit 120 may store the second information.

The processor 110 may load the first data block on the buffer cache, and refer to the first data block based on the second transaction or the session (S330). The processor 110 may determine whether to return the information related to the first data block based on whether the second log being flushed to the sharing storage (S340). Here, a meaning of returning the information related to the first data block may be appreciated as a meaning of delivering the information related to the first data block to the user.

Specifically, the processor 110 may determine that the second log is not flushed to the sharing storage up to a time point of receiving the first data block from at least one second database server 200 based on the second information stored in the storage unit 120. The processor 110 may determine whether the second log is flushed to the sharing storage after modifying the first data block. The reason is that the second log may be flushed to the sharing storage while the processor 110 refers to the first data block based on the second transaction or the session. When it is determined that the second log is flushed to the sharing storage, the processor 110 may return the information related to the first data block generated based on the second transaction or the session.

When it is determined that the second log is not flushed to the sharing storage, the processor 110 may not return the information related to the first data block. When the processor 110 determines not to return the information related to the first data block, the processor 110 may repeatedly perform the data block referring process or process the data block referring process as the failure. Hereinafter, an example in which the processor 110 repeatedly performs the data block referring process or processes the data block referring process as the failure will be described with reference to FIG. 5.

According to the configuration, when the first database server 100 receives the second information indicating that the second log is not flushed to the sharing storage, the first database server 100 may determine whether to return the information related to the first data block based on whether the second log being flushed to the sharing storage. When the information indicating that the second log is flushed to the sharing storage is synchronized from at least one second database server 200, the first database server 100 may return the information related to the first data block to the user. Therefore, when at least one second database server 200 is not down, the first database server 100 may quickly deliver the information related to the first data block to the user. When the second database server 200 does not flush the second log, but is down, the first database server 100 may not return the information related to the first data block to the user. Therefore, the first database server 100 may be prevented from delivering wrong data to the user.

According to some example embodiments, the first database server 100 may determine whether to return the information related to the first data block based on whether the second log being flushed to the sharing storage by at least one second database server 200. Hereinafter, a method in which the first database server 100 determines whether to return the information related to the first data block will be described with reference to FIG. 5.

Figure 5:
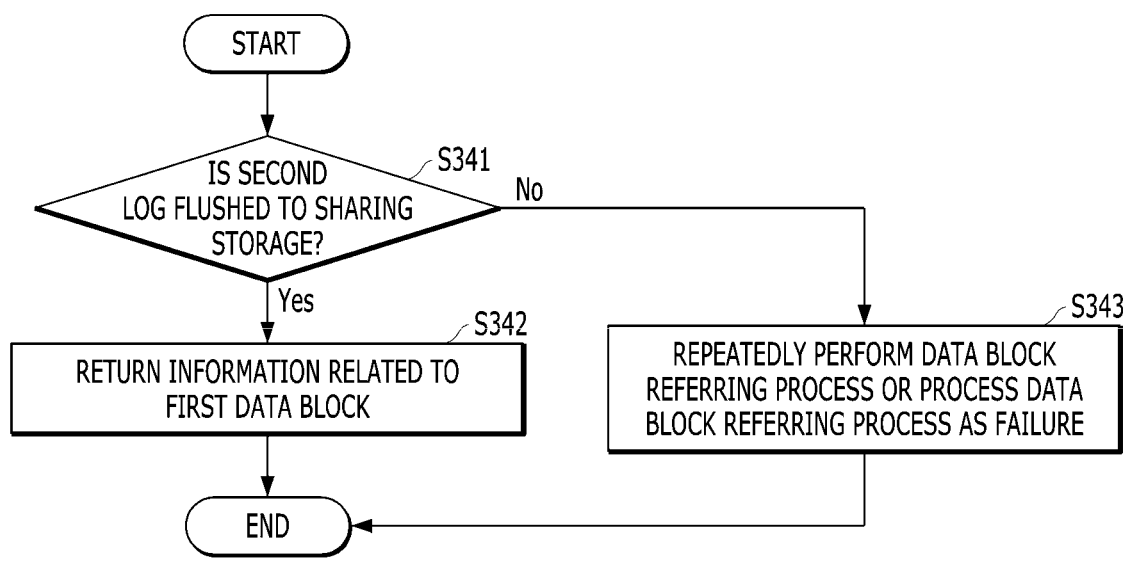
FIG. 5 is a flowchart for describing an example of a method for determining whether the first database server returns the information related to the first data block according to some example embodiments of the present disclosure.

FIG. 5 is a flowchart for describing an example of a method for determining whether the first database server returns the information related to the first data block according to some example embodiments of the present disclosure.

Referring to FIG. 5, the processor 110 of the first database server 100 when it is determined that the second log is flushed to the sharing storage (Yes in S341), the first database server 100 may return the information related to the first data block (S342).

Specifically, at least one second database server 200 may synchronize the information that the flushing of the second log is completed when the flushing of the second log is completed. For example, when the information that the flushing of the second log is completed is synchronized, the processor 110 may determine that the second log is flushed to the sharing storage. As it is determined that the second log is flushed to the sharing storage, the processor 110 may return the information related to the first data block.

When it is determined that the second log is not flushed to the sharing storage (No in S341), the processor 110 may repeatedly perform the data block referring process or process the data block referring process as the failure (S343). A meaning of repeatedly performing the data block referring process may be appreciated as a meaning of reperforming steps S310 to S340 described above. A meaning of processing the data block referring process as the failure may be appreciated as a meaning of processing operations of steps S310 to S340 performed above as the failure.

Specifically, when it is determined that the second log is not flushed to the sharing storage, the processor 110 may wait for flushing the second log to the sharing storage. When the second database server 200 does not flush the second log to the sharing storage, but is down, information that the second database server 200 is down may be delivered to the first database server 100. In this case, the processor 110 may repeatedly perform the data block referring process or process the data block referring process as the failure.

According to some example embodiments of the present disclosure, when the processor 110 processes the data block referring process as the failure, the processor 110 may generate information that the data block referring process is unsuccessful and return the information to the user.

According to the configuration, the first database server 100 may return the information related to the first data block based on whether the second log being flushed to the sharing storage. Alternatively, the first database server 100 may repeatedly perform the data block referring process or process the data block referring process as the failure based on whether the second log being flushed to the sharing storage.

Hereinafter, a method for determining whether to return the information related to the first data block when the first database server 100 modifies the first data block will be described.

Figure 6:
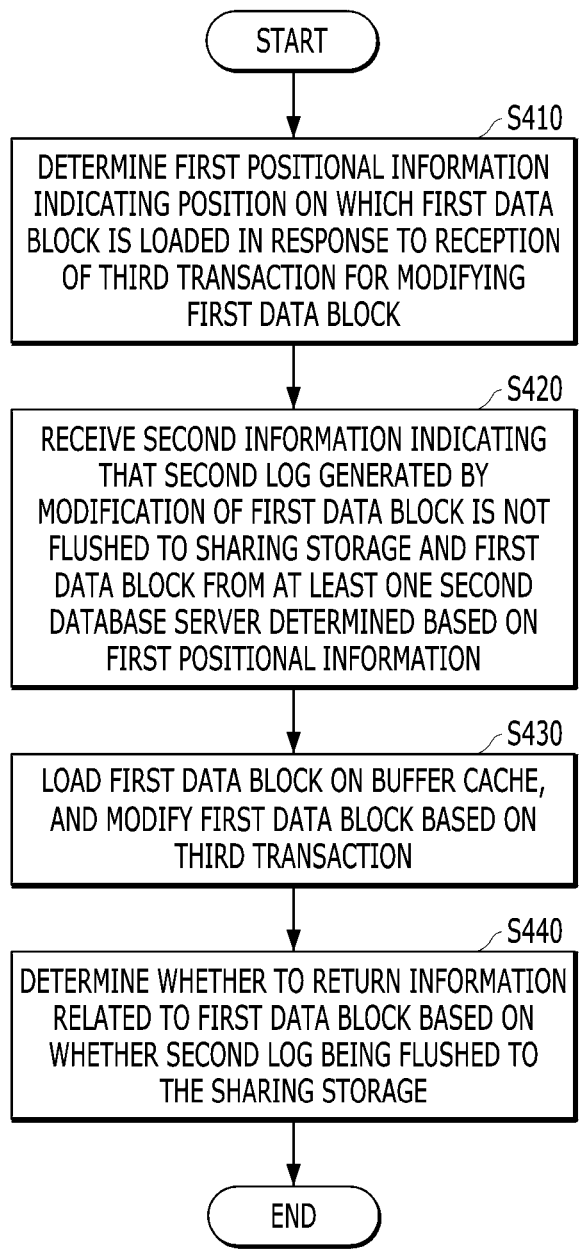
FIG. 6 is a flowchart for describing an example of a method for determining whether to return the information related to the first data block when the first database server modifies the first data block according to some example embodiments of the present disclosure.

FIG. 6 is a flowchart for describing an example of a method for determining whether to return the information related to the first data block when the first database server modifies the first data block according to some example embodiments of the present disclosure.

Referring to FIG. 6, the processor 110 of the first database server 100 may determine the first positional information indicating the position at which the first data block is loaded in response to reception of a third transaction for modifying the first data block (S310).

As an example, the processor 110 may determine the first positional information indicating the position of the buffer cache of the second database server on which the first data block is loaded among one or more second database servers 200 (S310). As another example, the first data block may also be loaded on the buffer cache of the first database server 100 itself. The processor 110 may determine the first positional information indicating the position of the first data block loaded on the buffer cache thereof. As still another example, the first data block may also be loaded on the sharing storage. The processor 110 may determine the first positional information indicating the position of the first data block loaded on the sharing storage.

The communication unit 130 may receive the second information indicating that the second log generated by the modification of the first data block is not flushed to the sharing storage and the first data block from at least one second database server 200 determined based on the first positional information (S320). When the storage unit 120 receives the second information through the communication unit 130, the storage unit 120 may store the second information.

The processor 110 may load the first data block on the buffer cache, and modify the first data block based on the third transaction (S330). The processor 110 may determine whether to return the information related to the first data block based on whether the second log being flushed to the sharing storage (S340).

Specifically, the processor 110 may determine that the second log is not flushed to the sharing storage up to a time point of receiving the first data block from at least one second database server 200 based on the second information stored in the storage unit 120. The processor 110 may determine whether the second log is flushed to the sharing storage after modifying the first data block. The reason is that the second log may be flushed to the sharing storage while the processor 110 modifies the first data block based on the third transaction and commits the third transaction. When it is determined that the second log is flushed to the sharing storage, the processor 110 may return the information related to the first data block modified based on the third transaction. Here, the information related to the first data block may include a result of modifying the first data block and a result of committing the third transaction.

When it is determined that the second log is not flushed to the sharing storage, the processor 110 may not return the information related to the first data block. When the processor 110 determines not to return the information related to the first data block, the processor 110 may roll back the first data block modified based on a fourth transaction related to the second log. Hereinafter, an example in which the processor 110 rolls back the first data block will be described with reference to FIG. 8.

According to the configuration, the first database server 100 may determine whether the second log is flushed to the sharing storage after the modification of the first data block is completed based on second information indicating that the second log is not flushed to the sharing storage. When the information indicating that the second log is flushed to the sharing storage is synchronized from at least one second database server 200, the first database server 100 may return the information related to the first data block to the user. Therefore, when at least one second database server 200 is not down, the first database server 100 may quickly deliver the information related to the first data block to the user. When the second database server 200 does not flush the second log, but is down, the first database server 100 may not return the information related to the first data block to the user. Therefore, the first database server 100 may be prevented from delivering wrong data to the user.

According to some example embodiments, the first database server 100 may determine whether to return the information related to the first data block based on whether the second log being flushed to the sharing storage by at least one second database server 200. Hereinafter, a method in which the first database server 100 determines whether to return the information related to the first data block will be described with reference to FIG. 7.

Figure 7:
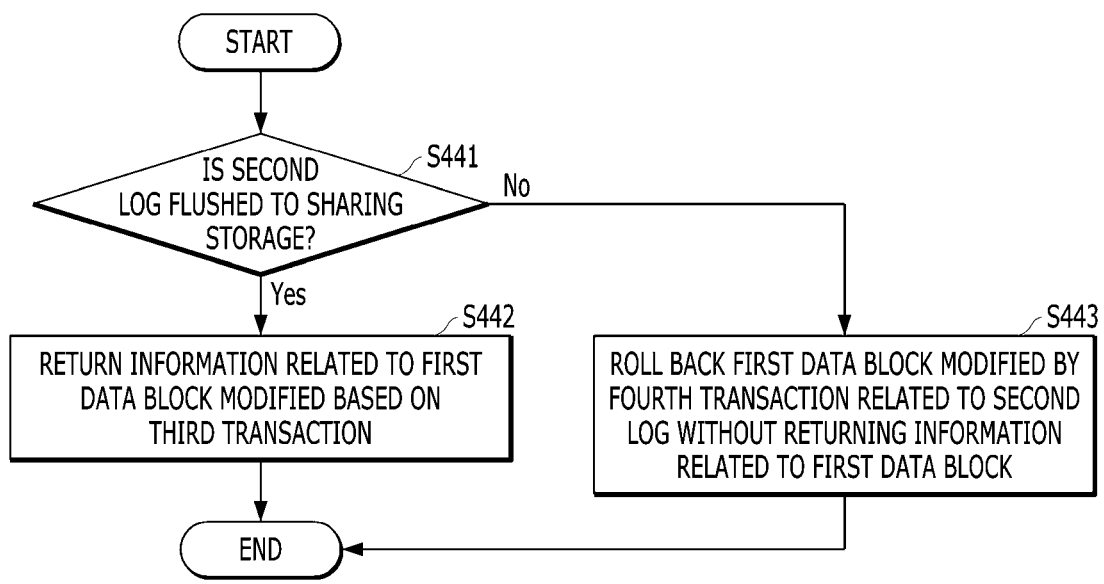
FIG. 7 is a flowchart for describing an example of a method for determining whether the first database server returns the information related to the first data block according to some example embodiments of the present disclosure.

FIG. 7 is a flowchart for describing an example of a method for determining whether the first database server returns the information related to the first data block according to some example embodiments of the present disclosure.

Referring to FIG. 7, the processor 110 of the first database server 100 when it is determined that the second log is flushed to the sharing storage (Yes in S441), the first database server 100 may return the information related to the first data block modified based on the third transaction (S442).

Specifically, at least one second database server 200 may synchronize the information that the flushing of the second log is completed when the flushing of the second log is completed. When the information that the flushing of the second log is completed is synchronized, the processor 110 may determine that the second log is flushed to the sharing storage. As it is determined that the second log is flushed to the sharing storage, the processor 110 may return the information related to the first data block modified based on the third transaction.

When it is determined that the second log is not flushed to the sharing storage (No in S441), the processor 110 may roll back the first data block modified by the fourth transaction related to the second log without returning the information related to the first data block (S444). Here, roll-back may be an operation of returning the first data block to the state before the modification.

Specifically, the processor 110 may invalidate the first data block in the buffer cache. A meaning of invalidating the first data block in the buffer cache may be appreciated as making the first data block in which the flushing of the log is not completed to a state in which at least one second database server 200 does not refers to the first data block. Further, when the first data block is invalidated in the buffer cache, all modified contents of the first data block by the transaction may be returned to a state before modification. According to the example embodiment, the first data block may be modified by the first transaction, the third transaction, and the fourth transaction. When the first data block is invalidated, the first data block may return to a state before the modification by the first transaction, the third transaction, and the fourth transaction. Hereinafter, a method in which the processor 110 rolls back the first data block will be described with reference to FIG. 8.

According to the configuration, the first database server 100 may return the information related to the first data block modified based on the third transaction when the second log is flushed to the sharing storage. Alternatively, when the second log is not flushed to the sharing storage, the first database server 100 may roll back the modified first data block. Therefore, even though at least one second database server 200 is down after modifying the first data block, the first database server 100 may roll back the first data block to the state before the modification.

Hereinafter, a specific method in which the first database server 100 rolls back the first data block will be described.

Figure 8:
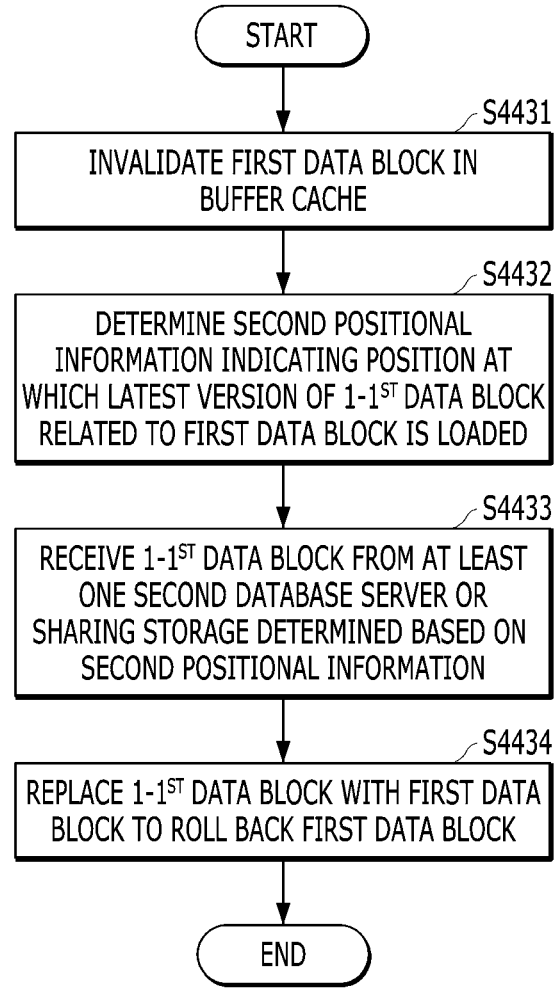
FIG. 8 is a flowchart for describing an example of a method in which the first database server rolls back the first data block according to some example embodiments of the present disclosure.

FIG. 8 is a flowchart for describing an example of a method in which the first database server rolls back the first data block according to some example embodiments of the present disclosure.

Referring to FIG. 8, the processor 110 of the first database server 100 may invalidate the first data block in the buffer cache (S4431).

Specifically, the processor 110 invalidates the first data block in which the flushing of the log is not completed in the buffer cache to disable at least one second database server 200 to refer to the first data block in which the flushing of the log is not completed. At least one second database server 200 may also invalidate the first data block in the buffer cache in link with the case where the first database server 100 invalidates the first data block in the buffer cache.

For example, the processor 110 may modify the first data block based on the first transaction, and flush the first log generated by the modification of the first data block to the sharing storage. The processor 110 may receive the first data block modified based on the fourth transaction from at least one second database server 200 through the communication unit 130. The second log generated as at least one second database server 200 modifies the first data block based on the fourth transaction may not be flushed to the sharing storage. In this case, the processor 110 may disable at least one second database server 200 to refer to the other first data block other than the first data block modified based on the first transaction.

The processor 110 may determine second positional information indicating a position at which a latest version of 1-$1^{st}$ data block related to the first data block is loaded (S4432). Here, the latest version of 1-$1^{st}$ data block may be a first data block including most modified contents. The latest version of 1-$1^{st}$ data block may be a first data block including contents modified by a transaction which is generated last. The latest version of 1-$1^{st}$ data block may be a first data block in which commit of the transaction is completed at a last time point. A commit time point as a logical time point internally managed by the first database server 100 and at least one second database server 200 may be expressed in a sequence form which monotonically increases. The first database server 100 may perform the commit for the first data block at a first time point. At least one second database server 200 may perform the commit for the first data block at a second time point after the first time point. The first data block of which commit is performed at the second time point may be a more latest version of first data block than the first data block of which commit is performed at the first time point. Since the commit time point is expressed in the sequence form which monotonically increases, the processor 110 may determine the latest version of 1-$1^{st}$ data block based on the commit time point. Further, at least one second database server 200 may also invalidate the first data block in the buffer cache in link with the case where the first database server 100 invalidates the first data block in the buffer cache. Therefore, the 1-$1^{st}$ data block in which the second positional information is determined by the processor 110 may be a data block in which the flushing of the log is completed.

The processor 110 may receive the 1-$1^{st}$ data block from at least one second database server 200 or the sharing storage determined based on the second positional information (S4433). According to the example embodiment, the latest version of 1-$1^{st}$ data block related to the first data block may be the data block loaded on the buffer cache of the first database server 100.

The processor 110 replaces the 1-$1^{st}$ data block with the first data block to roll back the first data block (S4434). Therefore, the latest version of first data block among the first data blocks in which the flushing of the log is completed may be loaded on the storage unit 120. In other words, even though at least one second database server 200 is down while not flushing the second log to the sharing storage after modifying the first data block based on the fourth transaction, the processor 110 may roll back the first data block to the state before the modification by the fourth transaction.

According to the configuration, when the first database server 100 is down while not completing the flushing of the log in at least one second database server 200, the first database server 100 may invalidate the first data block in which the flushing of the log is not completed in the buffer cache. As a result, the second database server which is not down among one or more second database servers 200 may be prevented from referring to the first data block in which the flushing of the log is not completed in the first database server 100. Therefore, the matching error which may occur in the database sever cluster environment may be prevented.

According to some example embodiments of the present disclosure, the first database server 100 may determine whether at least one third log which is not reflected on the 1-1$^{st}$ data block is flushed to the sharing storage. When at least one third log is flushed, the first database server 100 may recover the first data block based on a fifth transaction related to at least one third log. Hereinafter, a method in which the first database server 100 recovers the first data block will be described with reference to FIG. 9.

Figure 9:
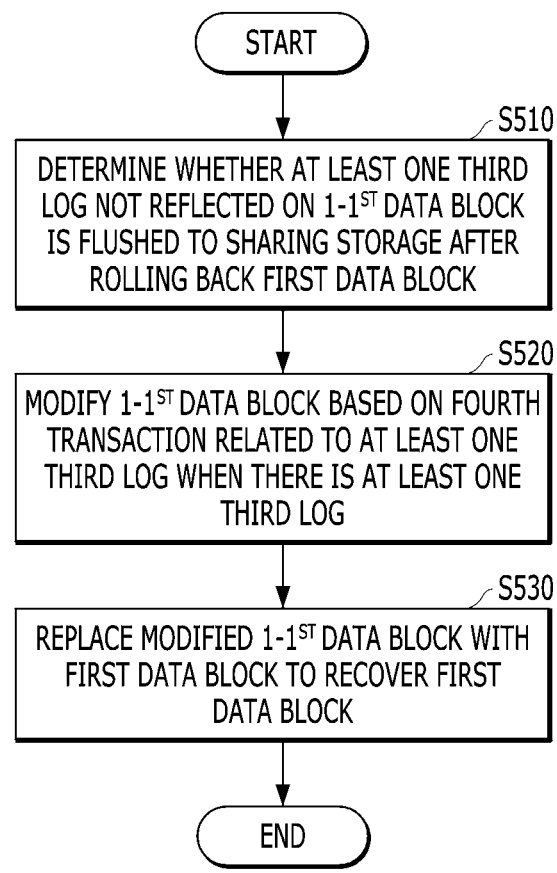
FIG. 9 is a flowchart for describing an example of a method in which the first database server recovers the first data block according to some example embodiments of the present disclosure.

FIG. 9 is a flowchart for describing an example of a method in which the first database server recovers the first data block according to some example embodiments of the present disclosure.

Referring to FIG. 9, the processor 110 of the first database server 100 may determine whether at least one third log which is not reflected on the 1-1$^{st}$ data block is flushed to the sharing storage after rolling back the first data block (S510).

For example, at least one second database server 200 may receive the first data block modified based on the first transaction from the first database server 100. The first log generated as the first data block is modified based on the first transaction may be flushed to the sharing storage. In at least one second database server 200, the fifth transaction may be generated before the fourth transaction is generated. At least one second database server 200 may modify the first data block based on the fifth transaction, and determine flushing the third log generated by the modification of the first data block to the sharing storage. After the modification of the first data block is completed based on the fifth transaction, at least one second database server 200 may modify the first data block based on the fourth transaction. At least one second database server 200 may determine flushing the second log generated as the first data block is modified based on the fourth transaction to the sharing storage. Thereafter, at least one second database server 200 completes the operation of flushing the third log to the sharing storage, but may be down while flushing the second log to the sharing storage. In this case, a 1-2$^{nd}$ data block which is a latest version among the first data blocks may be loaded on at least one second database server 200, but as at least one second database server 200 is down, the first database server may not refer to the 1-2$^{nd}$ data block. Therefore, the first database server 100 may determine the 1-1$^{st}$ data block modified based on the first transaction loaded on the buffer cache thereon as the latest version of data block among the first data blocks. The processor 110 may determine that the third log which is not reflected on the 1-1$^{st}$ data block which is the latest version of data block is flushed to the sharing storage. Since the commit time point related to the fifth transaction is recorded in the third log, the first database server 100 may determine the fifth transaction related to the third log as the transaction generated after the first transaction. In other words, the processor 110 may determine that at least one third log which is not reflected on the 1-1$^{st}$ data block is flushed based on the commit time point related to the fifth transaction recorded in at least one third log.

When there is at least one third log, the processor 110 may modify the 1-1$^{st}$ data block based on the fifth transaction related to at least one third log (S520). The third log may include modified contents of the first data block based on the fifth transaction and information capable of returning the first data block to the state before modification. Therefore, the processor 110 may modify the 1-1$^{st}$ data block based on the fifth transaction related to the third log.

The processor 110 replaces the modified 1-1$^{st}$ data block with the first data block to recover the first data block (S530).

According to the configuration, when at least one second database server 200 is down while not completing the flushing of the log, the first database server 100 may recover the first data block to the latest version of first data block. Further, the operation may be performed for the first data block of which flushing is completed as at least one second database server 200 is down. Specifically, as at least one second database server 200 is down, the second database server which is not down among one or more second database servers 200 may invalidate the first data block in each buffer cache in addition to the first database server 100. Therefore, the first data block which may be referenced in each buffer cache may be the first data block in which the flushing of the log is completed. As a result, the matching error which may occur in the plurality of database servers may be prevented.

The first database server 100 may determine second positional information indicating a position on which the latest version of 1-1$^{st}$ data block related to the first data block is loaded. When the first database server 100 does not determine the second positional information, but determines positional information indicating a position on which a predetermined first data block in which the flushing of the log is completed is loaded, there may also be multiple third logs in the sharing storage which are not reflected on the predetermined first data block. In this case, a long time for the first database server 100 to modify the predetermined first data block based on at least one third log may be required. Therefore, the first database server 100 determines second positional information indicating a position on which the latest version of 1-1$^{st}$ data block related to the first data block is loaded to save a time required for recovering the first data block.

Hereinafter, in FIGS. 10 to 12, the method for managing the database according to the present disclosure will be described with reference to the first to third database servers.

Figure 10:
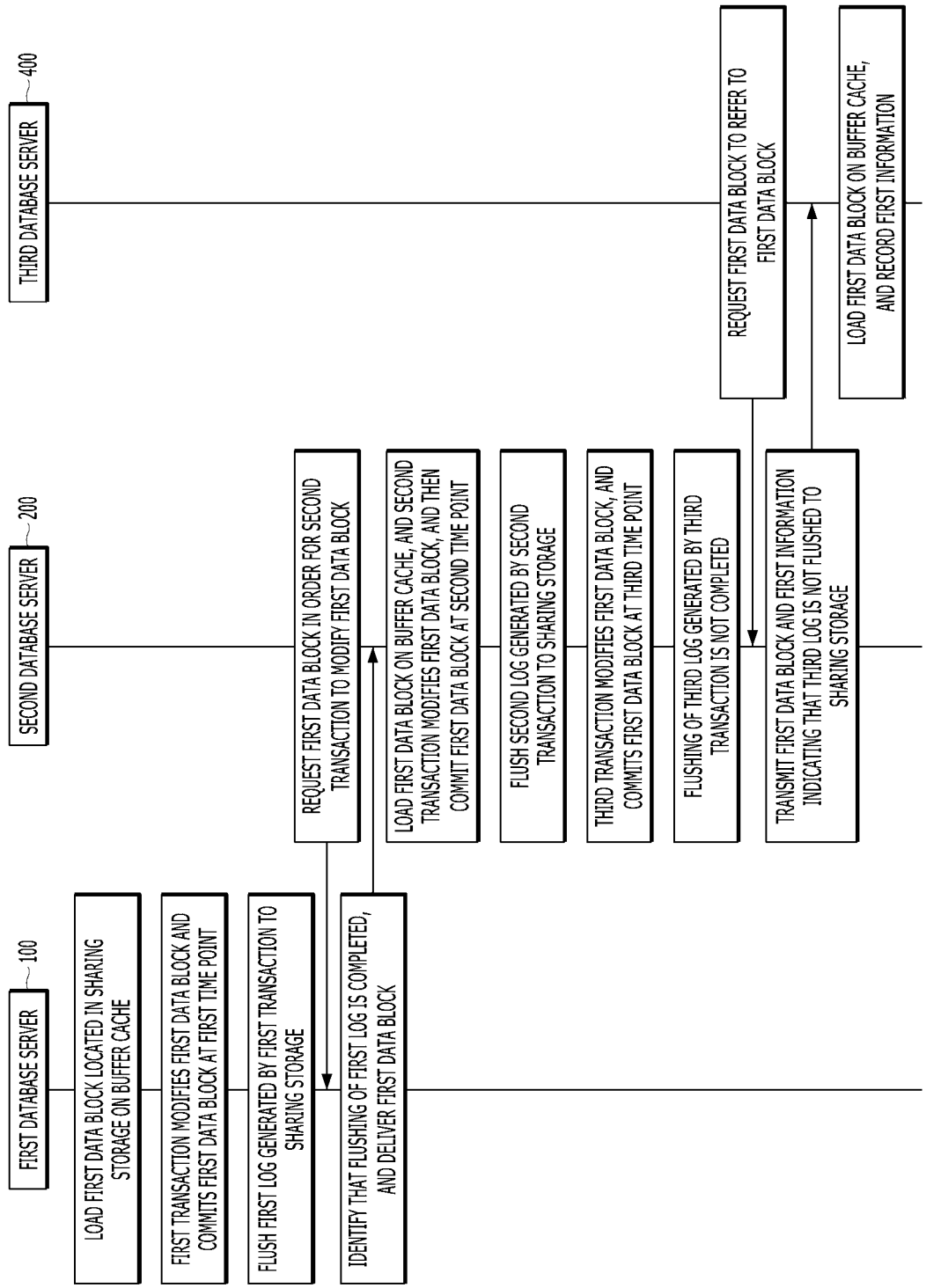
FIG. 10 is a flowchart for describing an example of a method for managing a database, which is performed by database servers according to some example embodiments of the present disclosure.

FIG. 10 is a flowchart for describing an example of a method for managing a database, which is performed by database servers according to some example embodiments of the present disclosure. FIG. 11 is a flowchart for describing an example of a method for returning the information related to the first data block, which is performed by the database servers according to some example embodiments of the present disclosure. FIG. 12 is a flowchart for describing an example of a method for rolling back the first data block, which is performed by the database servers according to some example embodiments of the present disclosure. Prior to describing FIGS. 10 to 12, the transactions in FIGS. 10 to 12 may be transaction different from the transactions described above. Further, the logs in FIGS. 10 to 12 may be logs different from the logs described above.

Referring to FIG. 10, the first database server 100, the second database server 200, and the third database server 400 may constitute the cluster. According to the example embodiment, each of the first database server 100, the second database server 200, and the third database server 400 may be the instance. The instance may be a virtual machine which may use the application or the resource stored in the main database server. The first database server 100 may be the first instance of the main database server. The second database server 200 may be the second instance of the main database server. The third database server 400 may be the third instance of the main database server. The first database server 100, the second database server 200, and the third database server 400 may share a storage such as the persistent storage medium. The sharing storage may store a plurality of data blocks and log files.

The first database server 100 may load the first data block located in the sharing storage on the buffer cache. The first data block may be a data block on which modified contents up to a 0-th time point are reflected.

The first transaction of the first database server 100 may modify the first data block loaded on the buffer cache, and commit the first data block at the first time point. The first data block may become a data block on which modified contents up to the first time point are reflected, and the first database server 100 may determine flushing the first log generated by the first transaction to the sharing storage. The first database server 100 may complete the flushing of the first log.

The second transaction of the second database server 200 may request the first data block loaded on the buffer cache of the first database server 100 in order to modify the first data block.

The first database server 100 may identify that the flushing of the first log for the first data block is completed and deliver the first data block to the second database server.

The second database server 200 may receive the first data block, and load the first data block on the buffer cache. The second transaction may modify the first data block, and then commit the first data block at the second time point. As a result, the first data block loaded on the buffer cache of the second database server 200 may be a data block on which modified contents up to the second time point are reflected. The second database server 200 may determine flushing the second log generated by the second transaction to the sharing storage. The second database server 200 may complete the flushing of the second log.

The third transaction of the second database server 200 may modify the first data block, and commit the first data block at the third time point. As a result, the first data block loaded on the buffer cache of the second database server 200 may be a data block on which modified contents up to the third time point are reflected. The first data block may be marked as a state in which the first data block is committed up to the third time point. The second database server 200 may determine flushing the third log generated by the third transaction to the sharing storage. A flushing task of the third log performed by the second database server 200 may be conducted.

The third database server 400 may request the first data block to the second database server 200 in order to refer to the first data block.

Since the third log generated by the third transaction is not flushed to the sharing storage, the second database server 200 may deliver, to the third database server 400, first information indicating that the third log is not flushed to the sharing storage, and the first data block.

The third database server 400 may receive the first data block and load the first data block on the buffer cache, and record first information indicating that the first data block is a data block in which the flushing of the third log is not completed in the memory.

Figure 11:
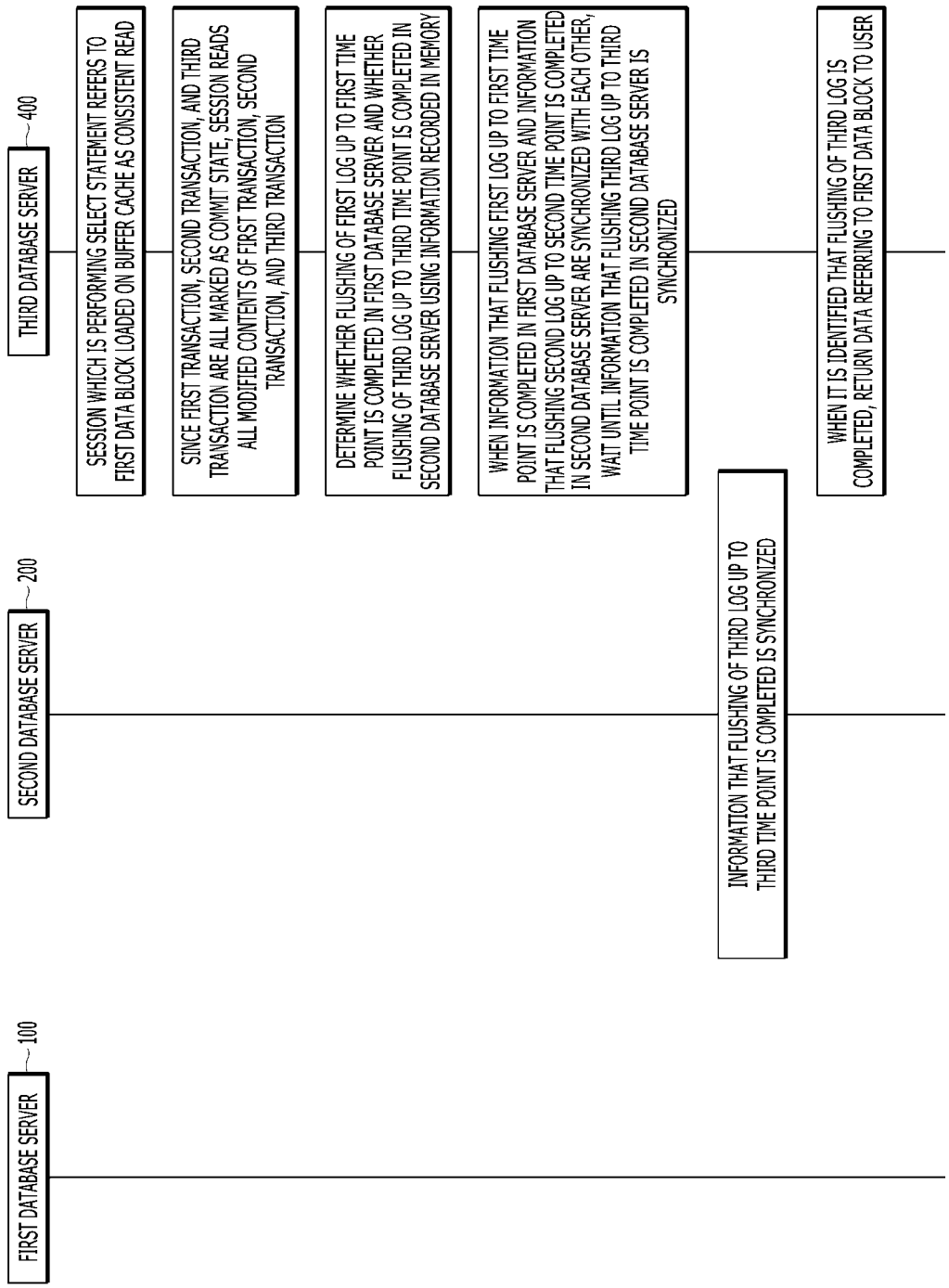
FIG. 11 is a flowchart for describing an example of a method for returning the information related to the first data block, which is performed by the database servers according to some example embodiments of the present disclosure.

Referring to FIG. 11, the session which performs select statement in the third database server 400 may refer to the first data block loaded on the buffer cache as consistent read. The session may mean an overall period up to a connection termination after performing multiple tasks by starting with the connection of the database. The session may include at least one transaction. In the present disclosure, the session may be appreciated as a subject using the first data block based on at least one transaction. The consistent read may be appreciated as a term meaning consistent read. For example, the database simultaneously accesses at multiple places to simultaneously connect a plurality of sessions. In this case, when another session other than a specific session refers to the data block while the specific session is changing the data block, the matching error may occur. Therefore, while the specific session is changing the data block, another session may refer to only a data block in which change or modification is confirmed, and such a feature may be appreciated as consistent read.

In the present disclosure, the first transaction that modifies the first data block in the first database server 100, the second transaction that modifies the first data block in the second database server 200, and the third transaction that modifies the first data block in the second database server 200 may be all committed. The first data block may be marked as a state in which the first transaction, the second transaction, and the third transaction are committed. As a result, the session of the third database server 400 may read all modified contents of the first transaction, the second transaction, and the third transaction. The third database server 400 may record, in the memory, the first information indicating that the first data block is the data block in which the flushing of the third log is not completed. The session of the third database server 400 may record information that the first database server 100 should wait for log flushing up to the first time point and the second database server 200 should wait for log flushing up to the second time point.

The session of the third database server 400 may determine whether the flushing of the first log is completed up to the first time point in the first database server 100 and whether the flushing of the third log is completed up to the third time point in the second database server 200.

The session of the third database server 400 which is performing select statement may complete collection and processing of data included in the first data block read as consistent read, and return the first data requested by the user to the user. The session of the third database server 400 may determine whether the flushing of the log is completed based on the recording of the information that the first database server 100 should wait for log flushing up to the first time point and the second database server 200 should wait for log flushing up to the second time point. The information that the flushing of the first log up to the first time point is completed in the first database server 100 may be synchronized by the first database server 100. The information that the flushing of the second log up to the second time point is completed in the second database server 200 may be synchronized by the second database server 200. Therefore, the session of the third database server 400 may determine to wait until the information that the flushing of the third log up to the third time point is completed in the second database server 200 is synchronized by the second database server 200.

Thereafter, the second database server 200 may synchronize the information that the flushing of the third log up to the third time point is completed.

The session which is performing select statement in the third database server 400 may return the first data to the user as the information that the flushing of the third log is completed is synchronized.

Figure 12:
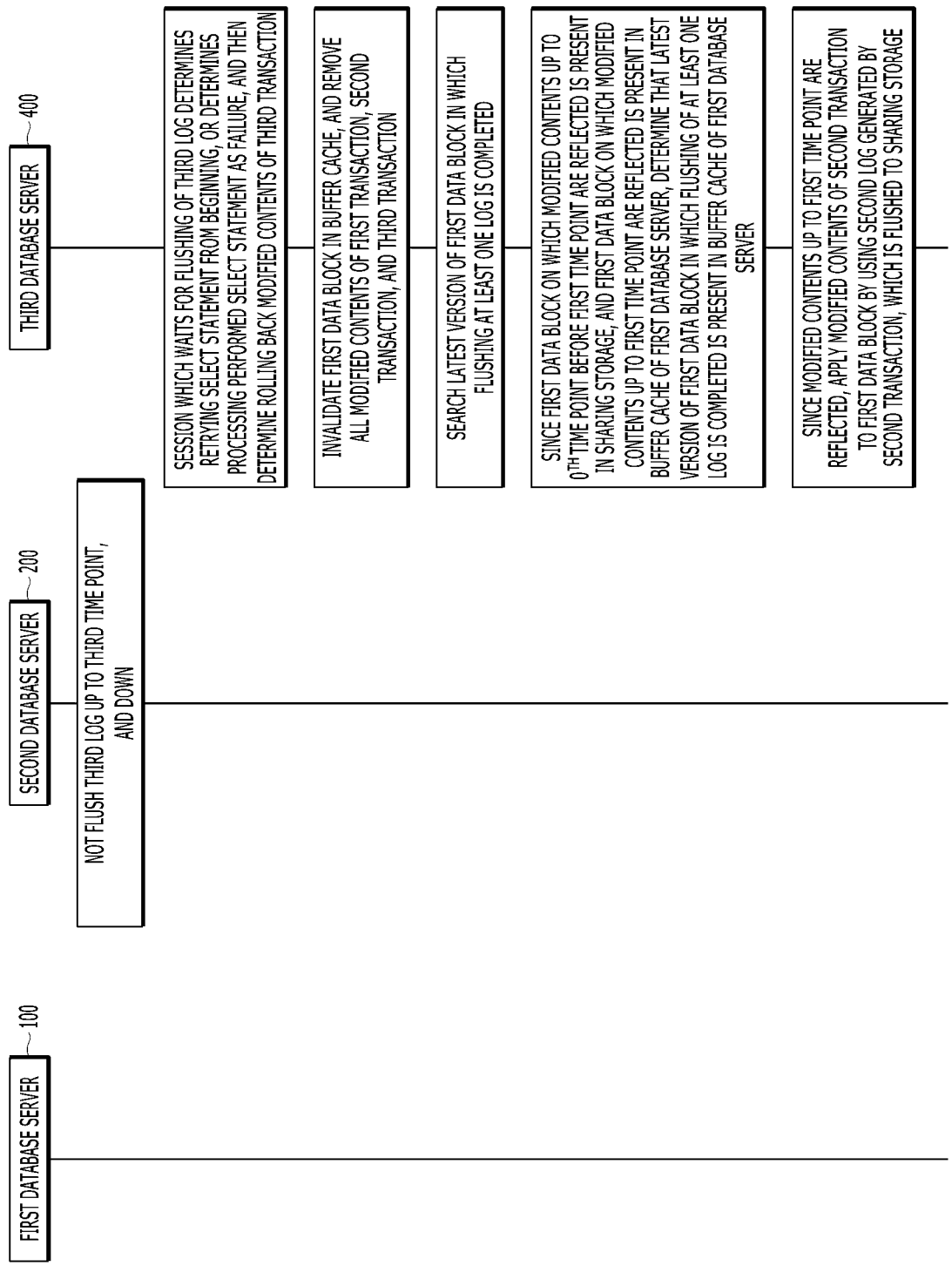
FIG. 12 is a flowchart for describing an example of a method for rolling back the first data block, which is performed by the database servers according to some example embodiments of the present disclosure.

Meanwhile, referring to FIG. 12, the second database server 200 may not flush the third log up to the third time point, and may be down.

The session of the third database server 400, which waits for completing the flushing the third log may determine retrying select statement from the beginning or determine processing select statement which is performing as the failure. As a result, the third database server 400 may be required to return all modified contents of the third transaction in the first data block on which the modified contents of the third transaction loaded on the buffer cache are reflected. The third database server 400 may determine rolling back the modified contents of the third transaction.

The third database server 400 may invalidate the first data block in the buffer cache. As a result, modifications of the third transaction may be removed from the first data block loaded on the buffer cache of the third database server 400, but modifications of the first and second transactions in which the flushing of the log is completed may also be removed jointly.

The third database server 400 may search the latest version of first data block in which flushing of at least one log is completed. A first data block on which modified contents up to a $0^{th}$ time point are reflected may be present in the sharing storage. The first data block on which the modified contents up to the first time point are reflected may be loaded on the buffer cache of the first database server 100. The first database server 100 may also invalidate the first data block in the buffer cache, but the first data block loaded on the buffer cache of the first database server 100 may be a data block in which the flushing of the first log is completed. Therefore, the third database server 400 may refer to the first data block loaded on the buffer cache of the first database server 100. The second database server 200 may be in a state of being down. As a result, the third database server 400 may determine the first data block in which the flushing of the first log up to the first time point is completed, which is loaded on the buffer cache of the first database server 100 as the latest version of first data block.

The third database server 400 may conduct the recovery task by using the first data block loaded on the buffer cache of the first database server 100. The first data block loaded on the buffer cache of the first database server 100 may be a data block in which the flushing of the first log up to the first time point is completed. Therefore, the third database server 400 may conduct the recovery task based on the second transaction of the second database server 200 generated after the first time point. The second log generated as the second transaction of the second database server 200 modifies the first data block may be flushed to the sharing storage. The second log may include modified contents of the first data block based on the second transaction and information capable of returning the second data block to the state before modification. Therefore, the third database server 400 may apply the modified contents of the second transaction to the first data block by using the second log. As a result, the first data block to which the modified contents of the first and second transactions are applied may be loaded on the third database server 400.

According to the configuration, the database servers constituting the cluster in an Active-Active database cluster environment may transmit the data block without waiting for the log flushing. Therefore, an access speed of the database server to a cluster shared cache may be enhanced, and as a result, load processing performance may be enhanced.

Figure 13:
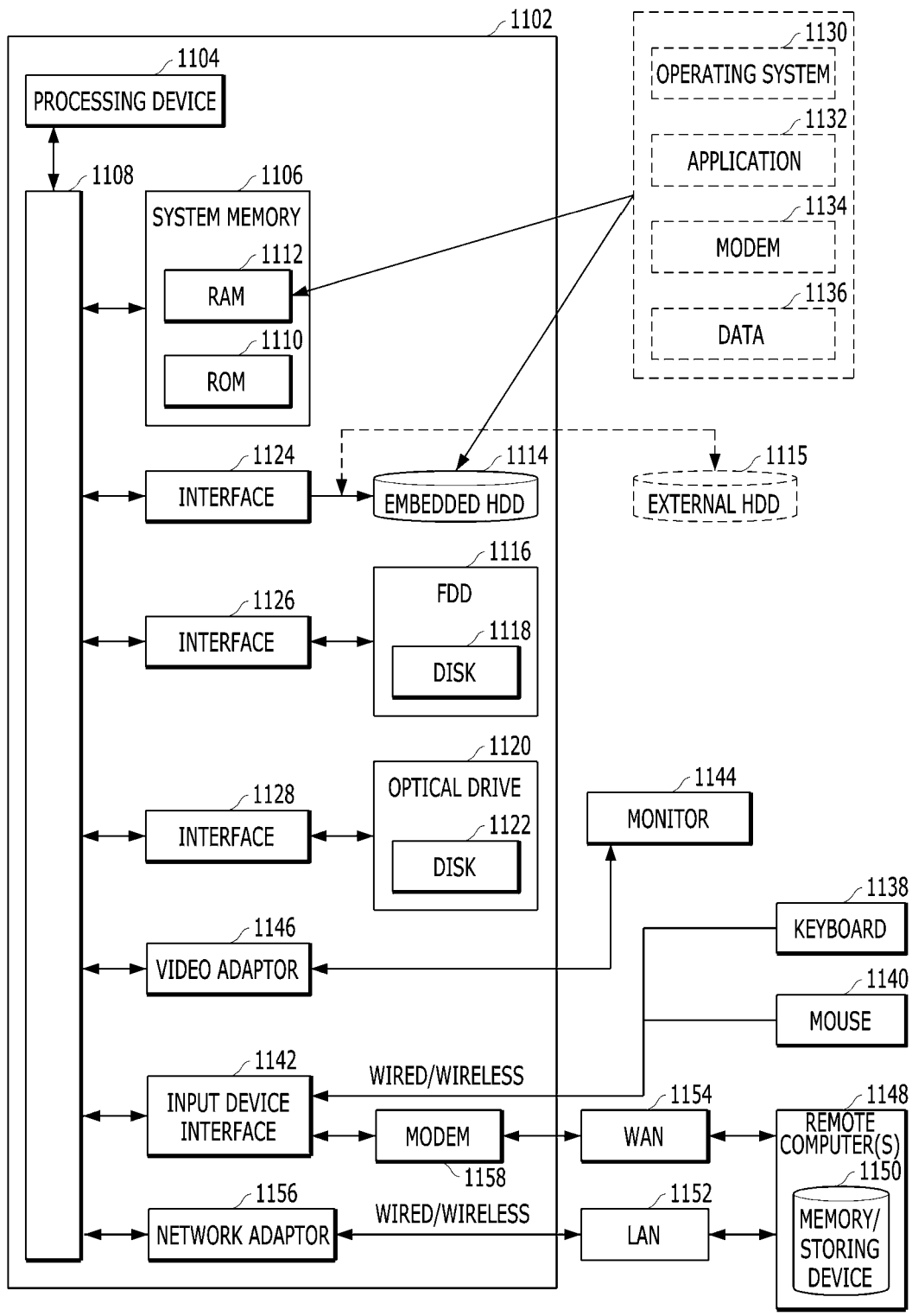
FIG. 13 is a general schematic view of an example computing environment in which example embodiments of the present disclosure may be implemented.

FIG. 13 is a simple and general schematic diagram illustrating an example of a computing environment in which the exemplary embodiments of the present disclosure are implementable.

The present disclosure has been generally described in relation to a computer executable command executable in one or more computers, but those skilled in the art will appreciate that the present disclosure is combined with other program modules and/or be implemented by a combination of hardware and software.

In general, a module in the present specification includes a routine, a procedure, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. The computer readable medium is a computer accessible medium, and includes volatile and non-volatile media, transitory and non-transitory media, and portable and non-portable media. As a non-limited example, the computer readable medium may include a computer readable storage medium and a computer readable transmission medium.

The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium implements a computer readable command, a data structure, a program module, or other data in a modulated data signal, such as a carrier wave or other transport mechanisms, and generally includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a specific time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of compute readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated well that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a server computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for managing a database, which is performed by a first database server including at least one processor constituting a cluster jointly with at least one second database server, the method comprising:
    loading, on a buffer cache, a first data block based on a first transaction for modifying the first data block located in a sharing storage shared jointly with the at least one second database server;
    modifying the first data block loaded on the buffer cache; and
    determining flushing a first log generated by the modification of the first data block to the sharing storage;
    determining first positional information indicating a position on which the first data block is loaded in response to reception of a third transaction for modifying the first data block;
    receiving at least one of second information indicating that a second log generated by the modification of the first data block is not flushed to the sharing storage and the first block, from the at least one second database server determined based on the first positional information;
    loading the first data block on the buffer cache, and modifying the first data block based on the third transaction; and
    determining whether to return the information related to the first data block corresponding to the third transaction based on whether the second log being flushed to the sharing storage, wherein the information related to the first data block includes a result of modifying the first data block and a commit result of the third transaction.

2. The method of claim 1, further comprising:
    receiving a request for delivery of the first data block from the at least one second database server;
    determining whether the first log is flushed to the sharing storage; and
    delivering first information indicating that the first log generated by the modification of the first data block is not flushed to the sharing storage, and the first data block to the at least one second database server when the first log is not flushed to the sharing storage.

3. The method of claim 1, further comprising:
    receiving a request for delivery of the first data block from the at least one second database server;
    determining whether the first log is flushed to the sharing storage; and
    delivering the first data block to the at least one second database server when the first log is flushed to the sharing storage.

4. The method of claim 1, further comprising:
determining whether to return information related to the first data block through a data block referring process, wherein the data block referring process includes:
determining first positional information indicating a position on which the first data block is loaded in response to reception of a second transaction or a session for referring to the first data block,
receiving at least one of second information indicating that a second log generated by the modification of the first data block is not flushed to the sharing storage and the first data block from the at least one second database server determined based on the first positional information,
loading the first data block on the buffer cache, and referring to the first data block based on the second transaction or the session, and
determining whether to return the information related to the first data block corresponding to the second transaction or session based on whether the second log being flushed to the sharing storage, wherein the information related to the first data block is data generated by referring to the first data block.

5. The method of claim 4, wherein the determining of whether to return the information related to the first data block corresponding to the second transaction or session based on whether the second log being flushed to the sharing storage includes:
when it is determined that the second log is flushed to the sharing storage, returning the information related to the first data block.

6. The method of claim 4, wherein the determining of whether to return the information related to the first data block corresponding to the second transaction or session based on whether the second log being flushed to the sharing storage includes:
repeatedly performing the data block referring process when it is determined that the second log is not flushed to the sharing storage, or
processing the data block referring process as a failure when it is determined that the second log is not flushed to the sharing storage.

7. The method of claim 1, wherein the determining of whether to return the information related to the first data block corresponding to the third transaction based on whether the second log being flushed to the sharing storage includes:
when it is determined that the second log is flushed to the sharing storage, returning the information related to the first data block modified based on the third transaction.

8. The method of claim 1, wherein the determining of whether to return the information related to the first data block corresponding to the third transaction based on whether the second log being flushed to the sharing storage includes:
when it is determined that the second log is not flushed to the sharing storage, rolling back the first data block modified by a fourth transaction related to the second log without returning the information related to the first data block.

9. The method of claim 8, wherein the rolling back of the first data block modified by the fourth transaction related to the second log without returning the information related to the first data block includes:

invalidating the first data block in the buffer cache,
determining second positional information indicating a position at which a latest version of $1\text{-}1^{st}$ data block related to the first data block is loaded,
receiving the $1\text{-}1^{st}$ data block from the at least one second database server or the sharing storage determined based on the second positional information, and
using the $1\text{-}1^{st}$ data block to roll back the first data block.

10. The method of claim 9, further comprising:
determining whether at least one third log not reflected on the $1\text{-}1^{st}$ data block is flushed to the sharing storage after rolling back the first data block;
when there is the at least one third log, modifying the $1\text{-}1^{st}$ data block based on a fifth transaction related to the at least one third log; and
using the modified $1\text{-}1^{st}$ data block to recover the first data block.

11. A first database server for managing a database, comprising:
a storage unit loading a first data block located in a sharing storage shared jointly with at least one second database server on a buffer cache; and
a processor modifying the first data block loaded on the buffer cache based on a first transaction for modifying the first data block, and determining flushing a first log generated by the modification of the first data block to the sharing storage, and
wherein the processor further performing:
determining first positional information indicating a position on which the first data block is loaded in response to reception of a third transaction for modifying the first data block;
receiving at least one of second information indicating that a second log generated by the modification of the first data block is not flushed to the sharing storage and the first block, from the at least one second database server determined based on the first positional information;
loading the first data block on the buffer cache, and modifying the first data block based on the third transaction; and
determining whether to return the information related to the first data block corresponding to the third transaction based on whether the second log being flushed to the sharing storage, wherein the information related to the first data block includes a result of modifying the first data block and a commit result of the third transaction.

12. A computer program stored in a computer-readable storage medium, wherein when the computer program is executed by one or more processors, the computer program executes a method for managing a database, the method comprising:
loading, on a buffer cache, a first data block based on a first transaction for modifying the first data block located in a sharing storage shared jointly with at least one second database server;
modifying the first data block loaded on the buffer cache; and
determining flushing a first log generated by the modification of the first data block to the sharing storage;
determining first positional information indicating a position on which the first data block is loaded in response to reception of a third transaction for modifying the first data block;
receiving at least one of second information indicating that a second log generated by the modification of the first data block is not flushed to the sharing storage and the first block, from the at least one second database server determined based on the first positional information;

loading the first data block on the buffer cache, and modifying the first data block based on the third transaction; and determining whether to return the information related to the first data block corresponding to the third transaction based on whether the second log being flushed to the sharing storage, wherein the information related to the first data block includes a result of modifying the first data block and a commit result of the third transaction.

13. The computer program of claim 12, the method further comprising:

receiving a request for delivery of the first data block from the at least one second database server;

determining whether the first log is flushed to the sharing storage; and delivering the first data block to the at least one second database server when the first log is flushed to the sharing storage.

14. The computer program of claim 12, the method further comprising:

determining whether to return information related to the first data block through a data block referring process, wherein the data block referring process includes:

determining first positional information indicating a position on which the first data block is loaded in response to reception of a second transaction or a session for referring to the first data block, receiving at least one of second information indicating that a second log generated by the modification of the first data block is not flushed to the sharing storage and the first data block from the at least one second database server determined based on the first positional information, loading the first data block on the buffer cache, and referring to the first data block based on the second transaction or the session, and determining whether to return the information related to the first data block corresponding to the second transaction or session based on whether the second log being flushed to the sharing storage, wherein the information related to the first data block is data generated by referring to the first data block.

15. The computer program of claim 14, wherein the determining of whether to return the information related to the first data block corresponding to the second transaction or session based on whether the second log being flushed to the sharing storage includes:

when it is determined that the second log is flushed to the sharing storage, returning the information related to the first data block.

16. The computer program of claim 14, wherein the determining of whether to return the information related to the first data block corresponding to the second transaction or session based on whether the second log being flushed to the sharing storage includes:

repeatedly performing the data block referring process when it is determined that the second log is not flushed to the sharing storage, or processing the data block referring process as a failure when it is determined that the second log is not flushed to the sharing storage.

17. The computer program of claim 12, the method further comprising:

receiving a request for delivery of the first data block from the at least one second database server;

determining whether the first log is flushed to the sharing storage; and delivering first information indicating that the first log generated by the modification of the first data block is not flushed to the sharing storage, and the first data block to the at least one second database server when the first log is not flushed to the sharing storage.

18. The computer program of claim 12, wherein the determining of whether to return the information related to the first data block corresponding to the third transaction based on whether the second log being flushed to the sharing storage includes:

when it is determined that the second log is flushed to the sharing storage, returning the information related to the first data block modified based on the third transaction.

19. The method of claim 12, wherein the determining of whether to return the information related to the first data block corresponding to the third transaction based on whether the second log being flushed to the sharing storage includes:

when it is determined that the second log is not flushed to the sharing storage, rolling back the first data block modified by a fourth transaction related to the second log without returning the information related to the first data block.

* * * * *